United States Patent
Busse et al.

(10) Patent No.: US 12,214,417 B2
(45) Date of Patent: Feb. 4, 2025

(54) CASTING MOULD FOR PRODUCING HELICAL CAST BODIES

(71) Applicant: Fraunhofer-Gesellschaft zur Förderung der angewandten Forschung e.V., Munich (DE)

(72) Inventors: Matthias Busse, Bremen (DE); Franz-Josef Wöstmann, Bremen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/250,888

(22) PCT Filed: Sep. 19, 2019

(86) PCT No.: PCT/EP2019/075191
§ 371 (c)(1),
(2) Date: Mar. 19, 2021

(87) PCT Pub. No.: WO2020/058412
PCT Pub. Date: Mar. 26, 2020

(65) Prior Publication Data
US 2021/0346944 A1    Nov. 11, 2021

(30) Foreign Application Priority Data
Sep. 19, 2018  (DE) ...................... 10 2018 215 955.6

(51) Int. Cl.
*B22C 9/22* (2006.01)
*B22C 9/06* (2006.01)
(Continued)

(52) U.S. Cl.
CPC ................ *B22C 9/22* (2013.01); *B22C 9/061* (2013.01); *B22C 9/064* (2013.01); *B22C 9/103* (2013.01); *H02K 15/045* (2013.01)

(58) Field of Classification Search
CPC ......... B22C 9/061; B22C 9/105; B22C 9/103; H02K 15/045
See application file for complete search history.

(56) References Cited

U.S. PATENT DOCUMENTS

| 875,097 | A | * | 12/1907 | McKee | ................... B22C 9/101 249/186 |
| 1,643,419 | A | * | 9/1927 | Perry | ....................... B22D 7/06 164/354 |

(Continued)

FOREIGN PATENT DOCUMENTS

| DE | 3644701 A1 | 7/1988 |
| DE | 102012006572 A1 | 7/2013 |

(Continued)

OTHER PUBLICATIONS

Machine Translation of Pille et al (EP 3208013 A1, published Aug. 23, 2017, cited in IDS filed Mar. 19, 2021). (Year: 2017).*

(Continued)

*Primary Examiner* — Kevin E Yoon
*Assistant Examiner* — Jacky Yuen
(74) *Attorney, Agent, or Firm* — Schwegman Lundberg & Woessner, P.A.

(57) ABSTRACT

The invention relates to a casting mould for producing helical cast bodies (1), in particular coils, springs or spirals, having a mould (10) in the form of a permanent mould which determines the outer contour of the helical body and consists of a ceramic material or is coated by a ceramic material; a supporting tool (8), which supports the mould (10) from outside; and a mould core (12), which defines the continuous opening within the helical body (1) and consists of a ceramic material or is coated by a ceramic material, the mould core being formed in particular as a core puller.

21 Claims, 2 Drawing Sheets

(51) Int. Cl.
  *B22C 9/10* (2006.01)
  *H02K 15/04* (2006.01)

(56) References Cited

U.S. PATENT DOCUMENTS

| | | | | |
|---|---|---|---|---|
| 1,769,455 | A | * | 7/1930 | Pickering .................. B22C 9/10 |
| | | | | 164/369 |
| 3,692,551 | A | * | 9/1972 | Weaver ............... B29C 33/0033 |
| | | | | 106/38.3 |
| 4,209,161 | A | * | 6/1980 | Horvath ................. B22D 17/24 |
| | | | | 249/180 |
| 4,462,455 | A | * | 7/1984 | Henych .................. B22D 17/24 |
| | | | | 164/369 |
| 4,614,630 | A | * | 9/1986 | Pluim, Jr. ............... B29C 45/37 |
| | | | | 264/328.2 |
| 4,774,990 | A | * | 10/1988 | Yamamoto ................ B22C 3/00 |
| | | | | 164/369 |
| 2015/0333588 | A1 | * | 11/2015 | Hinrich ..................... H01F 5/02 |
| | | | | 310/215 |

FOREIGN PATENT DOCUMENTS

| | | |
|---|---|---|
| DE | 102012212637 A1 | 1/2014 |
| DE | 102014106851 A1 | 11/2015 |
| EP | 1651404 B1 | 5/2009 |
| EP | 2688183 A2 | 1/2014 |
| EP | 3208013 A1 | 8/2017 |
| JP | 04258355 | 9/1992 |
| JP | 07112265 | 5/1995 |
| JP | 2012166207 | 9/2012 |
| JP | 2015002614 | 1/2015 |
| JP | 2015009259 A | 1/2015 |

OTHER PUBLICATIONS

"German Application Serial No. 10 2018 215 955.6, Office Action mailed Apr. 10, 2019", w/ Concise Statement of Relevance, (Apr. 10, 2019), 6 pgs.

"International Application Serial No. PCT/EP2019/075191, International Search Report mailed Dec. 9, 2019", w/ English Translation, (Dec. 9, 2019), 6 pgs.

"International Application Serial No. PCT/EP2019/075191, Written Opinion mailed Dec. 9, 2019", (Dec. 9, 2019), 5 pgs.

"Japanese Application Serial No. 2021-515136, Office Action dated Sep. 5, 2023", w English Translation, (Sep. 5, 2023), 9 pgs.

"Canadian Application Serial No. 3,112,867, Office Action dated Oct. 23, 2023", (Oct. 23, 2023), 4 pgs.

"Japanese Application Serial No. 2021-515136, Office Action dated Jan. 17, 2024", w English Translation, (Jan. 17, 2024).

"Chinese Application No. 201980061389.1, Office Action dated Jul. 31, 2024", w English Translation, (Jul. 31, 2024), 11 pgs.

"Canadian Application Serial No. 3,112,867, Office Action dated Nov. 5, 2024", (Nov. 5, 2024), 7 pgs.

* cited by examiner

CASTING MOULD FOR PRODUCING HELICAL CAST BODIES

PRIORITY APPLICATIONS

This application is a U.S. National Stage Filing under 35 U.S.C. § 371 from International Application No. PCT/EP2019/075191, filed on Sep. 19, 2019, and published as WO2020/058412 on Mar. 26, 2020, which claims the benefit of priority to German Application No. 10 2018 215 955.6, filed on Sep. 19, 2018; the benefit of priority of each of which is hereby claimed herein, and which applications and publication are hereby incorporated herein by reference in their entirety.

The invention resides in the field of foundry technology and can particularly advantageously be used during the production of spirals, springs or coils made of a metal, in particular copper.

Wound coils are used in electrical machines. The coils do not optimally fill the available installation space. This results in lower power or torque density of the electrical machines in relation to the weight or the installation space. Cast Cu coils are able to compensate for this drawback, but so far no methods for producing cast Cu coils or cast coils made of Cu alloys which are suitable for series production in permanent molds having a sufficient service life are known.

So as to increase the power density or the torque density of electrical machines, complex coils, which frequently are manually produced, heretofore are wound to slightly further improve the fill level compared to series methods. Across the height of the windings, wire having the same cross-section is used. Furthermore, in conventional electrical machines, the windings of the coil situated on top of one another from the inside to the outside adversely affect the heat dissipation and result in greater heating of the coils, and thus in a necessary limitation of the maximum current density in relation to the cross-section of the winding.

Cast Cu coils or cast coils made of Cu alloys are known in principle, however heretofore are not produced in permanent molds, but in lost molds, such as in the investment casting process or in the lost foam process.

Against the background of the prior art, it is an object of the invention to create an option for producing cast metal coils using tools that can be used numerous times.

The invention relates to a casting mold for producing helical cast bodies, in particular coils or spirals, comprising a die in the form of a permanent mold, which establishes the outer contour of the helical bodies and is made of a ceramic material, or is coated with a ceramic material, comprising a supporting tool, which supports the die from the outside, and comprising a mold core, which defines the continuous opening inside the helical body and is made of a ceramic material, or is coated with a ceramic material, wherein the mold core is in particular designed as a core puller.

With respect to the inner shape, that is, the hollow interior which establishes the outer contour of the coil, the die can have the shape of a cone or of a frustum of a pyramid, so that the shape of a cone or of a frustum of a pyramid is imparted to the cast body. In terms of the contour, the mold core can essentially, that is, for example with the exception of a demolding incline, be designed to be cylindrical or conical or in the manner of a frustum of a pyramid. When the coil is placed onto a tooth of a motor sheet, the tooth can have straight contours, so that also an inner contour of the coil which is cylindrical or cuboid is expedient. Accordingly, the outer contour of the mold core for this case can also have a cylindrical or cuboid shape, or the shape of a cone or of a four-sided pyramid or of a frustum of a cone or of a pyramid.

In the case of a conical or pyramidal outer contour, the wall thickness of the coil body can increase toward the end of the coil located radially on the outside in an electrical machine. Accordingly, the height of the individual windings, measured in the longitudinal direction of the coil, can decrease along the coil toward the thicker end of the coil, that is, toward the end thereof having a larger outside diameter, in particular with a constant overall cross-section of each individual winding.

Advantageously, it can be provided that the core puller comprises one or more projections, which define the helix and separate different, mutually adjoining windings of the helix of the cast body from one another.

The geometry of the projections at the core puller and/or at the die can be configured in such a way that the pitch and/or the winding thickness of the helical body is constant, or variable, over the length thereof, that is, for example, increases or decreases toward one end.

A continuously helical projection can be provided on the surface of the core puller, which defines the negative shape of the helix as well as the mutually facing interfaces of the individual helical turns. The projection is arranged between the individual helical turns of the cast body during the casting process.

Furthermore, it may advantageously be provided that the core puller moves in at least one or two directions during demolding.

For this purpose, it may be provided that the core puller is composed of two or three, or more than three, sub-bodies which, for example, have a prismatic or wedge-shaped design, of which at least two, three, or more than three, in each case form a portion of the surface of the core puller that abuts the helical body.

The sub-bodies can, for example, each be designed to have a circular ring segment-shaped cross-section.

Together, multiple sub-bodies can form a hollow, in particular hollow cylindrical, body, wherein at least one of the sub-bodies can be displaced or moved radially toward the inside. It may also be provided that at least one of the sub-bodies of the core puller is made of a material that can be dissolved, such as, for example, a salt body that can be dissolved in water or a crushable sand mold body. This dissolvable sub-body can support the remaining, at least partially non-dissolvable and reusable sub-bodies during the casting process.

In principle, the core can thus comprise at least one dissolvable or destructible sub-body and at least one non-dissolvable sub-body, which can be used as a permanent mold, wherein advantageously only the sub-bodies that can be used as a permanent mold come in contact with the casting material or the melt.

Furthermore, it may advantageously be provided that the core puller rotates during removal from the mold and thereby supports the demolding from the coil.

Furthermore, it may advantageously be provided that the core puller is made of a ceramic material, in particular a foundry sand material, which can be dissolved after a casting process.

The die, which can have a consistent or quadrangular pyramidal inner contour, can have a constant wall thickness across the length of the coil to be cast therein. In this case, the outer contour extends parallel to the inner contour. In this way, that is, due to the constant wall thickness of the die serving as a tool insert, uneven heating or cooling of the die is avoided in the case of rapid temperature changes.

Serving as a tool insert, the die is advantageously inserted into a steel mold. This can have a conically or pyramidally tapering inner contour, so that multiple parts of a potentially multi-piece die are reliably positioned and compressed during insertion into the steel mold, even under thermal loads.

The die completely accommodates the casting material, for example copper, so that the casting material does not make contact with the steel mold, but in particular exclusively makes contact with ceramic surfaces of the die and mold core. In this way, thermal damage to the steel mold during the casting of Cu coils is avoided.

Furthermore, it can advantageously be provided that the die comprises one or more projections, which define the helix and separate different, mutually adjoining windings of the helix of the cast body from one another.

A continuously helical projection can be provided on the surface of the die, which defines the negative shape of the helix as well as the mutually facing interfaces of the individual helical turns. The projection is arranged between the individual helical turns of the cast body during the casting process.

The coil can also overall be defined by a projection on the die and a projection on the core puller, which bear on one another during the casting process.

Furthermore, it may advantageously be provided that the die has a multi-piece design and is configured such that multiple parts of the die are removed from one another after each casting process for demolding.

Furthermore, it may advantageously be provided that the die and/or a mold core are entirely or partially made of titanium nitride, titanium carbonitride, silicon carbide, silicon nitride or aluminum oxide.

In general, low-pressure die casting and die casting are conceivable casting processes suitable for series production, in particular for the above-described casting mold. However, the embodiments of the invention also apply to all other casting methods in which permanent molds are employed.

In particular, the following aspects can be advantageous, which can apply individually or in groups:
 a) shaping by way of casting, in which the main contour of the coil is created in a permanent mold which is closed, filled, and opened for removing the solidified coil or clusters with coils at the manufacturing cycle intervals.
 b) The shape-imparting contour in the permanent mold can be implemented as a ceramic mold insert within a supporting steel tool.
 c) In the tool, the Cu melt exclusively comes in contact with the ceramic inserts or ceramic surfaces.
 d) The ceramic inserts are made entirely or partially of titanium nitride, titanium carbonitride, silicon carbide, silicon nitride or aluminum oxide or similar ceramic materials.
 e) The inner contour of the coil is implemented by a permanent core of the tool, serving as the core puller, which moves in one or two directions for demolding, so as to be able to demold the undercuts at the inner contour of the coil. The materials listed under d) can be materials of the permanent core. The use of lost cores is advantageous for optimizing cycle times and production costs.
 f) As an alternative to e), a lost core can be used for creating the coil inner geometry, which is made of salt or water-soluble plastic material or other materials, so that the core can be rinsed/dissolved/destroyed after the casting process.
 g) In conjunction with a simplified manner of producing molds by introducing helical cavities into a processable mold body with the aid of a rotating and, at the same time, translatorily moving cutting tool, the geometry of the ceramic inserts is considerably simplified, so that in general the use of lost cores can be dispensed with.
 h) The ceramic mold inserts can also be produced by way of freeze gelling (according to EP1651404 B1), for example.
 i) After the maximum service life has been reached or the mold inserts have been damaged, these are replaced by way of a quick-change system in the tool. Corresponding mold inserts are to be produced and kept in stock in sufficient quantity and are replaced in a very short time.
 j) As an alternative, the mold inserts are produced in a layered manner from a ceramic powder bed by way of additive manufacturing. For this purpose, conformal cooling channels can be integrated into the mold inserts for reducing the cycle time and improving the microstructure of the Cu coils.
 k) Proceeding from common structural ceramics, such as titanium nitride, titanium carbonitride, silicon carbide, silicon nitride or aluminum oxide, the ceramic inserts are further developed and adapted and optimized with respect to the alternating temperature stress loads during casting.
 l) Optimization variables during material developments of the ceramic mold insert are as low a thermal coefficient of expansion as possible and easy demolding of the cast coils.
 m) As an alternative to d), the shape-imparting contour can also be implemented as a ceramic coating or as a ceramically coated mold insert within a supporting steel tool of the permanent mold.

The invention makes it possible to produce cast coils from Cu or Cu alloys in permanent molds, and thereby considerably increase the productivity during series production use. At the same time, the production costs of the method are lowered, and the technological advantages of the cast coils become usable for electrical machines.

The invention will be shown and described hereafter by way of example in figures of a drawing. In the drawings.

Figure 1:
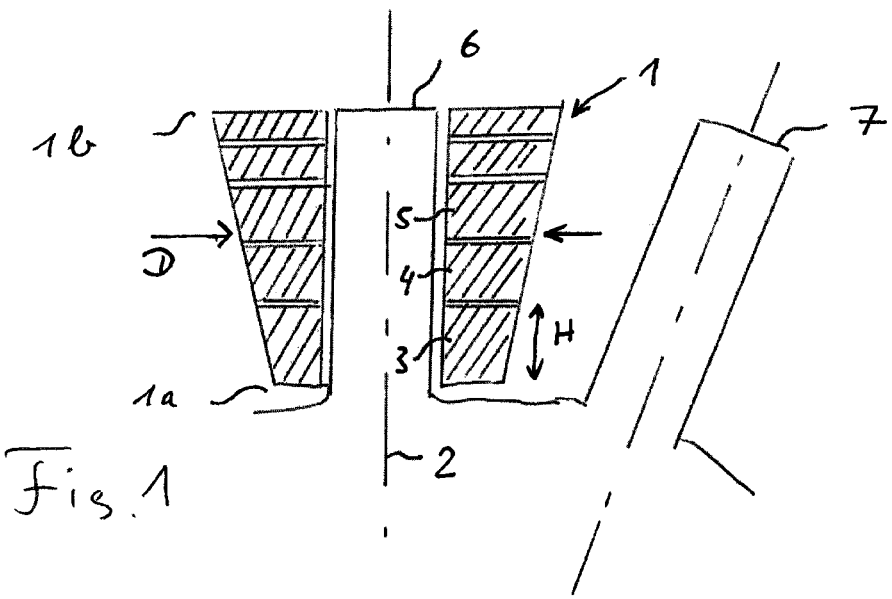
FIG. 1 shows a cross-section of a coil on a tooth/pole of a sheet of an electric motor.

In a longitudinal sectional view, FIG. 1 shows a cast body in the form of an electrical coil 1 made of copper to be produced in a casting process, the longitudinal axis of which is denoted by reference numeral 2. The outside diameter D of the coil 1 increases in a linear manner from the first end 1a, which is closest to a rotational axis when installed in an electrical machine, toward the second end 1b. The height H of the individual windings 3, 4, 5 decreases toward the second end 1b. The inside diameter of the coil 1 is constant across the length thereof. The coil in FIG. 1 is shown in the position thereof in which it surrounds a tooth/pole 6 of a lamination stack of an electrical machine. Another pole is denoted by reference numeral 7.

Figure 2:
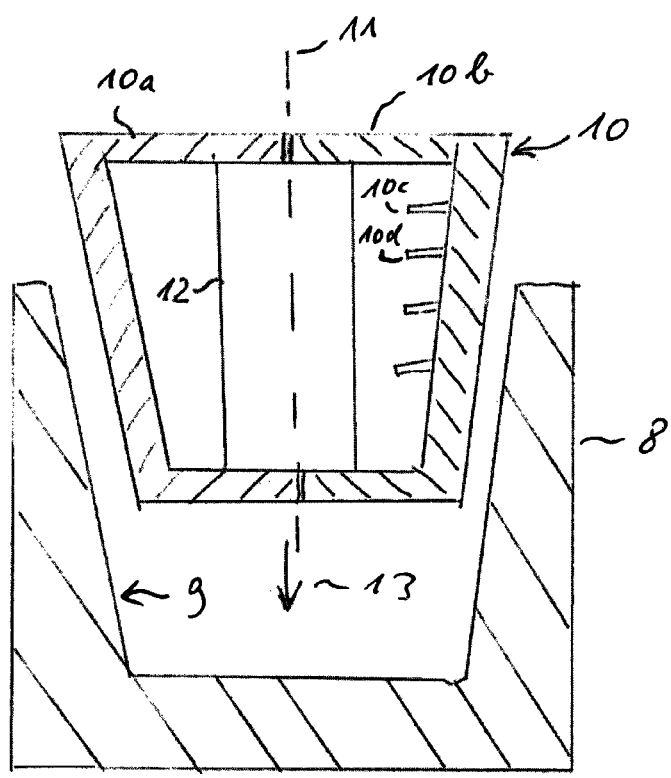
FIG. 2 shows a cross-section of the die and the steel mold.

FIG. 2 shows a steel mold 8, having an inner contour 9 which accommodates a die 10 in the form of a two-piece conical ceramic insert with precise fit. The die is divided into the two parts 10a, 10b along the line 11. For the sake of clarity, the gate system is not shown.

Within the die 10, a mold core 12 is shown, which is cylindrically designed in the example, serving as a core puller. Projections 10c, 10d are shown by way of example on the inside of the die 10, which entirely or partially create or implement the spaces between the individual windings during casting. During the insertion into the supporting tool in the form of the steel mold 8, the die is radially compressed in the direction of the arrow 13 and provides sealing along the joint 11. The metal casting material, for example copper, then exclusively makes contact with the die 10 and the mold core 12, which are both made of ceramic or can be coated with a ceramic material.

Figure 3:
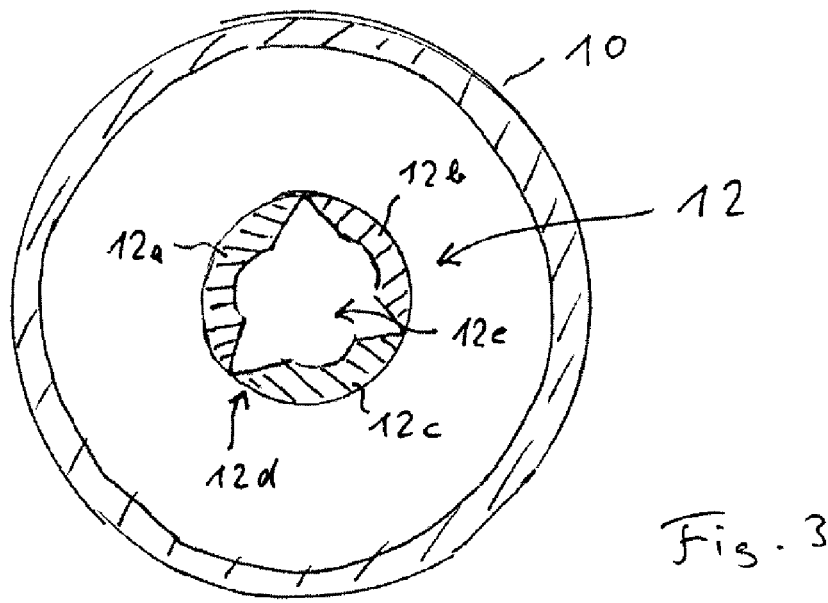
FIG. 3 shows a cross-section of the die and a core puller.
Figure 4:
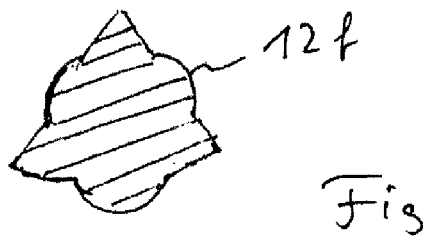
FIG. 4 shows a sub-body of the core puller.

FIG. 3 shows the die 10 and a core puller 12 including sub-bodies 12a, 12b, 12c, which can be moved with respect to one another and together form the circumferential surface 12d of the core puller 12, in a cross-sectional view. Each of the sub-bodies 12a, 12b, 12c forms a prismatic body having a semi-cylindrical, curved surface. In possible embodiments, the sub-bodies 12a, 12b, 12c can also have a wedge-shaped design. The wall thickness of the sub-bodies is lower in the regions in which these bear on one another than in the remaining regions, so that free wedge regions are formed between the sub-bodies 12a, 12b, 12c, which enable a radial movement of the core puller 12.

During the casting process, the sub-bodies 12a, 12b, 12c can be supported in the central cavity 12e formed between them by a support body 12f, which can either be pulled out axially or is designed as a dissolvable body so as to be destructible, for the core puller 12 to be moved. After the sub-body designed as a support body 12f has been removed, at least one of the remaining sub-bodies 12a, 12b, 12c can then move in the radial direction.

For example, the core puller 12 can also comprise circumferential helical projections at the cylindrical circumference thereof, which separate individual windings of the helix to be cast from one another.

Figure 5:
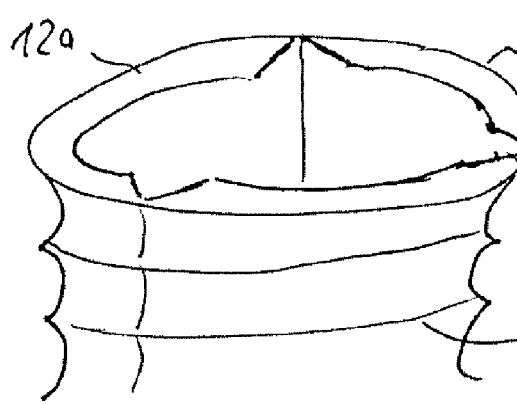
FIG. 5 shows a perspective illustration of a core puller.

FIG. 5 shows a perspective illustration of a multi-piece core puller without the support body.

The invention claimed is:

1. A casting mold for producing a helical cast body, the casting mold comprising:
a die in the form of a permanent mold, wherein the permanent mold establishes an outer contour of the helical cast body, wherein the die is made of a ceramic material or is coated with a ceramic material, the die comprising:
a supporting tool, which supports the die from outside the die, and
a mold core, which defines a continuous opening inside the helical cast body, wherein the mold core is made of a ceramic material or is coated with a ceramic material, and wherein the mold core is designed as a core puller, wherein the core puller includes two or more movable sub-bodies, wherein the two or more movable sub-bodies are movable with respect to one another and wherein at least two of the two or more movable sub-bodies form a portion of a surface of the core puller that abuts the helical cast body, wherein the core puller comprises at least two non-dissolvable sub-bodies, wherein the at the least two non-dissolvable sub-bodies form a portion of a surface of the core puller that abuts the helical cast body, and wherein only the at least two non-dissolvable sub-bodies make contact with a casting material or melt.

2. The casting mold according to claim 1, wherein the core puller comprises:
one or more projections which define a helix of the helical cast body and separate different mutually adjoining windings of the helix of the helical cast body from one another.

3. The casting mold according to claim 1, wherein the core puller moves in at least one direction during demolding.

4. The casting mold according to claim 3, wherein the core puller moves in at least two directions during demolding.

5. The casting mold according to claim 1, wherein the core puller rotates during demolding.

6. The casting mold according to claim 1, wherein the core puller comprises a sub-body forming a support body made of a ceramic material which is dissolvable after a casting process.

7. The casting mold according to claim 6, wherein the ceramic material is a foundry sand material.

8. The casting mold according to claim 1, wherein the die further comprises:
one or more projections which define a helix of the helical cast body and separate different mutually adjoining windings of the helix of the helical cast body from one another.

9. The casting mold according to claim 8, wherein the die includes a multi-piece design and is configured such that multiple parts of the die are removed from one another after each casting process for demolding.

10. The casting mold according to claim 1, wherein at least one of the die or the mold core are at least partially made of at least one of: titanium nitride, titanium carbonitride, silicon carbide, silicon nitride or aluminum oxide.

11. The casting mold according to claim 1, wherein the helical cast body is at least one of: a coil, a spring, or a spiral.

12. The casting mold according to claim 1, wherein the core puller comprises a sub-body forming a support body made of a ceramic material that is dissolvable after a casting process, wherein the support body during the casting process is located in a central cavity formed between the two or more movable sub-bodies which together are forming at least a portion of a circumferential surface of the core puller.

13. A casting mold for producing a helical cast body, comprising:
a die in the form of a permanent mold which forms an outer contour of the helical cast body, wherein the die is made of a ceramic material or is coated with a ceramic material, the die including:
a supporting tool configured to support the die from outside the die;
a mold core that defines a continuous opening inside the helical cast body, wherein the mold core is made of a ceramic material or is coated with a ceramic material, and wherein the mold core is designed as a core puller, the core puller comprising:
a projection that defines at least a portion of a helix forming the helical cast body and separates different mutually adjoining windings of the helix from one another; and
two or more movable sub-bodies, wherein the two or more movable sub-bodies are movable with respect to one another, wherein at least two of the two or more movable sub-bodies form a portion of a surface of the core puller that abuts the helical cast body, wherein the core puller further comprises at least two non-dissolvable sub-bodies, wherein the at least two non-dissolvable sub-bodies form a portion of a surface of the core puller that abuts the helical cast body, and wherein only the at least two non-dissolvable sub-bodies make contact with a casting material or melt.

14. The casting mold of claim 13, wherein the core puller moves in at least one direction during demolding.

15. The casting mold of claim 13, wherein the core puller moves in at least two directions during demolding.

16. The casting mold of claim 13, wherein the core puller rotates during demolding.

17. The casting mold of claim 13, wherein the core puller includes a ceramic material that is dissolvable after a casting process.

18. A die for a casting mold, the die comprising:
  a supporting tool configured to support the die from outside the die; and
  a mold core that defines a continuous opening inside a helical cast body, wherein the mold core is made of a ceramic material or is coated with a ceramic material, and wherein the mold core includes a core puller, the core puller comprising:
    a projection that defines at least a portion of a helix forming the helical cast body, and separate different, mutually adjoining windings of the helix from one another; and
    two or more movable sub-bodies, wherein the two or more movable sub-bodies are movable with respect to one another, and wherein at least two of the two or more movable sub-bodies form a portion of a surface of the core puller that abuts the helical cast body;
  wherein the mold core comprises at least two non-dissolvable sub-bodies, forming a portion of a surface of the core puller that abuts the helical cast body, wherein only the at least two non-dissolvable sub-bodies make contact with a casting material or melt, wherein the die is in the form of a permanent mold which establishes an outer contour of the helical cast body, wherein the die comprises a ceramic material or is coated with a ceramic material, and wherein the die includes a multi-piece die and is configured such that multiple parts of the die are removed from one another after each casting process for demolding.

19. The die of claim 18, further comprising:
  a projection that defines the helix and separates different mutually adjoining windings of the helix forming the helical cast body from one another.

20. The die of claim 18, wherein the die is at least partially made of at least one of:
  titanium nitride, titanium carbonitride, silicon carbide, silicon nitride or aluminum oxide.

21. The die of claim 18, wherein the helical cast body is at least one of: a coil, a spring, or a spiral.

* * * * *